(12) United States Patent
Masui et al.

(10) Patent No.: US 11,975,716 B2
(45) Date of Patent: May 7, 2024

(54) DEVICE FOR SETTING TARGET VEHICLE, SYSTEM FOR SETTING TARGET VEHICLE, AND METHOD FOR SETTING TARGET VEHICLE

(71) Applicants: DENSO CORPORATION, Kariya (JP); TOYOTA JIDOSHA KABUSHIKI KAISHA, Toyota (JP)

(72) Inventors: Yohei Masui, Kariya (JP); Ryo Mizuno, Kariya (JP); Takashi Maeda, Nagoya (JP); Naoki Kusumoto, Okazaki (JP); Yuki Tezuka, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/645,848

(22) Filed: Dec. 23, 2021

(65) Prior Publication Data
US 2022/0111842 A1     Apr. 14, 2022

Related U.S. Application Data

(63) Continuation of application No. 16/829,984, filed on Mar. 25, 2020, now Pat. No. 11,235,766, which is a
(Continued)

(30) Foreign Application Priority Data

Sep. 28, 2017   (JP) ................... 2017-187659

(51) Int. Cl.
*B60W 30/00*   (2006.01)
*B60W 30/16*   (2020.01)

(52) U.S. Cl.
CPC ....... *B60W 30/162* (2013.01); *B60W 2552/53* (2020.02); *B60W 2554/801* (2020.02); *B60W 2554/806* (2020.02); *B60W 2556/10* (2020.02)

(58) Field of Classification Search
CPC .......... B60W 30/162; B60W 2556/10; B60W 2552/53; B60W 2554/806; B60W 2554/801
See application file for complete search history.

(56) References Cited

U.S. PATENT DOCUMENTS 4,786,164 A  *  11/1988  Kawata ................. G01C 3/08
                                                                356/4
5,710,565 A       1/1998  Shirai et al.
(Continued)

FOREIGN PATENT DOCUMENTS

DE        101 49 146 A1     4/2003
DE   10 2016 113 286 A1     1/2017
(Continued)

OTHER PUBLICATIONS

M. Amoozadeh, "Platoon Management with Cooperative Adaptive Cruise Control Enabled by VANET," 2015 (Year: 2015).*
(Continued)

*Primary Examiner* — Elaine Gort
*Assistant Examiner* — Brittany Renee Peko
(74) *Attorney, Agent, or Firm* — MASCHOFF BRENNAN

(57) ABSTRACT

A device for setting a target vehicle that sets a target vehicle to be subjected to driving assistance control of a host vehicle includes: a detection signal acquisition device capable of acquiring a first detection signal representing an object by an image, and a second detection signal representing the object by a reflection point; and setting control unit, which determines whether to set a forward object as a target vehicle, wherein if a movement history is not associated with the forward object, and a combination history is associated with the forward object, then as a selection threshold of a first determination parameter for determining whether to set the forward object as the target vehicle, a selection threshold is
(Continued)

used such that the forward object is less likely to be selected as the target vehicle than with the selection threshold which would be used if a movement history is associated with the forward object.

6 Claims, 13 Drawing Sheets

Related U.S. Application Data continuation of application No. PCT/JP2018/028242, filed on Jul. 27, 2018.

(56) References Cited

U.S. PATENT DOCUMENTS

| | | | |
|---|---|---|---|
| 6,945,346 B2 * | 9/2005 | Massen | B60K 31/00 |
| | | | 180/170 |
| 9,476,976 B2 | 10/2016 | Kijima et al. | |
| 2005/0010351 A1 | 1/2005 | Wagner et al. | |
| 2008/0249688 A1 * | 10/2008 | Sawamoto | G06F 17/00 |
| | | | 701/48 |
| 2011/0295548 A1 * | 12/2011 | Takabayashi | G06F 15/00 |
| | | | 702/142 |
| 2013/0204505 A1 | 8/2013 | Sauer | |
| 2014/0169630 A1 * | 6/2014 | Fukata | G06K 9/00805 |
| | | | 382/103 |
| 2014/0222278 A1 | 8/2014 | Fujita | |
| 2017/0021833 A1 | 1/2017 | Abdel-Rahman et al. | |
| 2017/0341642 A1 * | 11/2017 | Suzuki | B60W 30/09 |
| 2018/0009438 A1 | 1/2018 | Masui et al. | |
| 2018/0079409 A1 * | 3/2018 | Nath | B60W 30/12 |
| 2018/0170384 A1 * | 6/2018 | Masui | B60W 30/165 |
| 2019/0143972 A1 | 5/2019 | Ishioka et al. | |
| 2020/0231151 A1 * | 7/2020 | Aoki | B60W 30/16 |

FOREIGN PATENT DOCUMENTS

| | | | | |
|---|---|---|---|---|
| JP | H08-279099 | A | | 10/1996 |
| JP | 2004-082944 | A | | 3/2004 |
| JP | 2005145396 | A | * | 6/2005 ............ B60K 31/00 |
| JP | 2007331608 | A | * | 12/2007 ............ B60K 31/00 |
| JP | 2008-007062 | A | | 1/2008 |
| JP | 2019038363 | A | * | 1/2017 ......... B60W 30/165 |
| JP | 2017-47707 | A | | 3/2017 |
| JP | 2017-047707 | A | | 3/2017 |

OTHER PUBLICATIONS

U.S. Appl. No. 16/829,984 and its entire file history, filed Mar. 25, 2020, Masui et al.

* cited by examiner

DEVICE FOR SETTING TARGET VEHICLE, SYSTEM FOR SETTING TARGET VEHICLE, AND METHOD FOR SETTING TARGET VEHICLE

CROSS-REFERENCE TO RELATED APPLICATION

This application is a continuation application of U.S. patent application Ser. No. 16/829,984, filed on Mar. 25, 2020, which is a bypass application of International Application No. PCT/JP2018/028242, filed on Jul. 27, 2018, which designated the U.S. and claims priority to Japanese Patent Application No. 2017-187659, filed on Sep. 28, 2017, the contents of which are incorporated herein by reference.

TECHNICAL FIELD

The present disclosure relates to a technique for setting a target vehicle to be subjected to driving assistance control of a host vehicle.

BACKGROUND

A driving assistance control technique is known that supports driving of a host vehicle with respect to a forward object using a detection signal from an object detector, such as a camera or radar. A driving assistance control technique is sought which is capable of appropriately setting, from among forward object, a target vehicle to be subjected to driving assistance control of the host vehicle. For example, proposed is a technique for appropriately setting, from among forward object, a forward object that exists in the same lane as the host vehicle as a target vehicle, that is, as a preceding vehicle (for example, see JP H8-279088 A).

SUMMARY

A first aspect provides a device for setting a target vehicle that sets a target vehicle to be subjected to driving assistance control of a host vehicle. The device for setting a target vehicle according to the first aspect includes: a detection signal acquisition device capable of acquiring a first detection signal representing an object by an image, and a second detection signal representing the object by a reflection point; and a setting control unit which determines whether to set a forward object as a target vehicle, wherein if a movement history, which indicates that the forward object has been detected as a mobile object, is not associated with the forward object, and a combination history, which indicates that the forward object has been determined to be a vehicle using a combination of the first detection signal and the second detection signal, is associated with the forward object, then as a selection threshold of a first determination parameter for determining whether to set the forward object as the target vehicle, a selection threshold is used such that the forward object is less likely to be selected as the target vehicle than with the selection threshold which would be used if a movement history is associated with the forward object.

A second aspect provides a method for setting a target vehicle that sets a target vehicle to be subjected to driving assistance control of a host vehicle. The method for setting a target vehicle according to the second aspect includes: acquiring a first detection signal representing an object by an image, and a second detection signal representing the object by a reflection point; and determining whether to set a forward object as a target vehicle, wherein if a movement history, which indicates that the forward object has been detected as a mobile object, is not associated with the forward object, and a combination history, which indicates that the forward object has been determined to be a vehicle using a combination of the first detection signal and the second detection signal, is associated with the forward object, then as a selection threshold of a first determination parameter for determining whether to set the forward object as the target vehicle, a selection threshold is used such that the forward object is less likely to be selected as the target vehicle than with the selection threshold which would be used if a movement history is associated with the forward object.

BRIEF DESCRIPTION OF THE DRAWINGS

The above objects and other objects, features and advantages of the present disclosure will be made clearer by the following detailed description, given referring to the appended drawings. In the accompanying drawings.

DETAILED DESCRIPTION OF THE PREFERRED EMBODIMENTS

Figure 1:
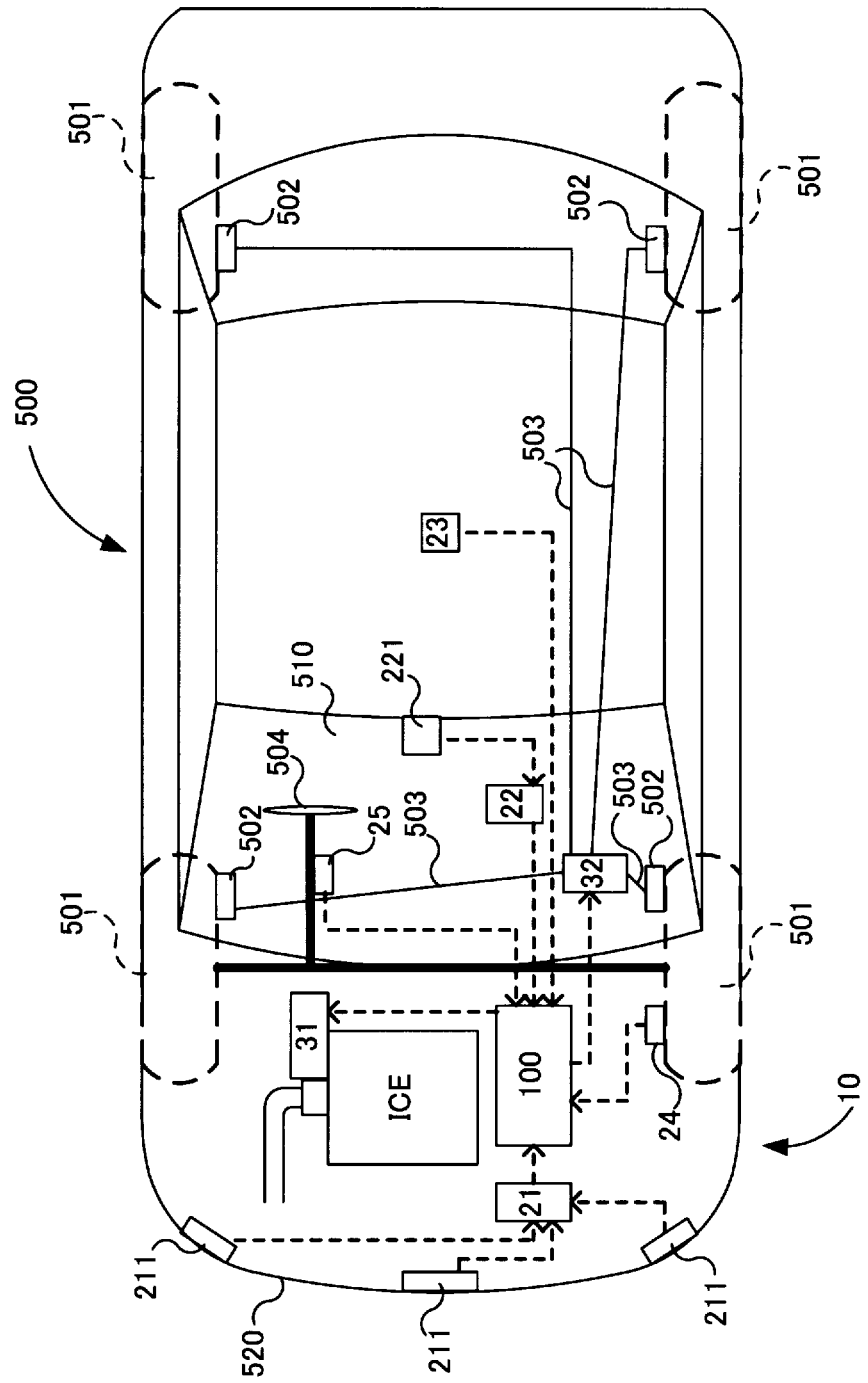
FIG. 1 is an explanatory diagram showing a vehicle equipped with a device for setting a target vehicle according to a first embodiment.

If the forward object does not exist on the same travel trajectory as the host vehicle, and the target vehicle is uniformly set without consideration of stationary vehicles with a low likelihood of moving, and moving vehicles which have a movement history or which are currently moving, the execution frequency of driving assistance control increases, which hinders the smooth driving of the host vehicle, and further, may give the driver the impression that the driving assistance control is excessive.

Therefore, it is desired to appropriately set the target vehicle according to whether a forward object is a stationary vehicle or a moving vehicle.

The present disclosure has been made in order to solve the problems described above, and is achievable as the following aspects.

A first aspect provides a device for setting a target vehicle that sets a target vehicle to be subjected to driving assistance control of a host vehicle. The device for setting a target vehicle according to the first aspect includes: a detection signal acquisition device capable of acquiring a first detection signal representing an object by an image, and a second detection signal representing the object by a reflection point; and a setting control unit which determines whether to set a forward object as a target vehicle, wherein if a movement history, which indicates that the forward object has been detected as a mobile object, is not associated with the forward object, and a combination history, which indicates that the forward object has been determined to be a vehicle using a combination of the first detection signal and the second detection signal, is associated with the forward object, then as a selection threshold of a first determination parameter for determining whether to set the forward object as the target vehicle, a selection threshold is used such that the forward object is less likely to be selected as the target vehicle than with the selection threshold which would be used if a movement history is associated with the forward object.

According to the device for setting a target vehicle of the first aspect, setting of the target vehicle can be appropriately executed according to whether a forward object is a stationary vehicle or a moving vehicle.

A second aspect provides a method for setting a target vehicle that sets a target vehicle to be subjected to driving assistance control of a host vehicle. The method for setting a target vehicle according to the second aspect includes: acquiring a first detection signal representing an object by an image, and a second detection signal representing the object by a reflection point; and determining whether to set a forward object as a target vehicle, wherein if a movement history, which indicates that the forward object has been detected as a mobile object, is not associated with the forward object, and a combination history, which indicates that the forward object has been determined to be a vehicle using a combination of the first detection signal and the second detection signal, is associated with the forward object, then as a selection threshold of a first determination parameter for determining whether to set the forward object as the target vehicle, a selection threshold is used such that the forward object is less likely to be selected as the target vehicle than with the selection threshold which would be used if a movement history is associated with the forward object.

According to the method for setting a target vehicle of the second aspect, the target vehicle can be appropriately set according to whether a forward object is a stationary vehicle or a moving vehicle. The present disclosure may also be realized as a program for setting a target vehicle, or a computer-readable recording medium that has the program recorded thereon.

Hereinafter, a device for setting a target vehicle, a system for setting a target vehicle, and a method for setting a target vehicle according to the present disclosure will be described based on several embodiments.

First Embodiment

As shown in FIG. 1, a device for setting a target vehicle 10 according to a first embodiment is used by being installed on a vehicle 500. The device for setting a target vehicle 10 includes at least a control device 100, and a system for setting a target vehicle includes, in addition to the device for setting a target vehicle 10, a radar ECU 21, a camera ECU 22, a yaw rate sensor 23, a wheel speed sensor 24, a rotation angle sensor 25, a throttle drive device 31, and a brake assistance device 32. The vehicle 500 includes an internal combustion engine ICE, wheels 501, braking devices 502, brake lines 503, a steering wheel 504, a windscreen 510, and a front bumper 520. The radar ECU 21 is connected to a millimeter-wave radar 211, which emits a radio wave and detects a reflected wave from an object, and uses the reflected wave acquired by the millimeter-wave radar 211 to generate and output a detection signal that represents the object by a reflection point. The camera ECU 22 is connected to the forward camera 221 and generates and outputs a detection signal indicating an object by an image using the image acquired by the forward camera 221 and a shape pattern of the object prepared in advance. Each ECU is a microprocessor including a calculation unit, a storage unit, and an I/O unit. The radar ECU 21 and the millimeter-wave radar 211 correspond to a first detection unit, and the camera ECU 22 and the forward camera 221 correspond to a second detection unit. The detector for detecting the reflected wave may use, in addition to the millimeter-wave radar 211, a LIDAR (laser radar) or an ultrasonic detector that emits a sound wave and detects a reflected wave. The imaging unit that captures the object may use, in addition to the forward camera 221, a stereo camera or a multi-camera configured by two or more cameras.

In the vehicle 500, the internal combustion engine ICE is provided with a throttle drive device 31 that drives a slot valve for controlling the output of the internal combustion engine ICE by adjusting an intake air amount. When a diesel engine having a constant intake air amount is provided as the internal combustion engine ICE, a fuel injection device drive device that controls the fuel injection amount from the fuel injection device can be used instead of the throttle valve drive device 31. In the vehicle 500, a braking device 502 is provided on each wheel 501. The braking devices 502 realize the braking of the wheels 501 by means of a brake fluid pressure supplied via the brake lines 503 in response to a brake pedal operation performed by the driver. The brake lines 503 include a brake piston and a brake fluid line for producing the brake fluid pressure in response to a brake pedal operation. In the present embodiment, the brake assistance device 32 is provided on the brake lines 503, and is capable of controlling the fluid pressure independently of the brake pedal operation, thereby realizing braking assistance. The brake lines 503 may represent control signal lines instead of brake fluid lines, and a configuration which causes an actuator provided in each braking device 502 to be operated may be employed. The steering wheel 504 is connected to the front wheels 501 via a steering mechanism 505 which includes a steering rod. As a driving assistance control, the throttle drive device 31 and the brake assistance device 32 realize constant travel speed/inter-vehicle distance control processing, which causes the host vehicle to be driven at a set vehicle speed while maintaining a constant inter-vehicle distance between the preceding vehicle and the host vehicle, that is, an adaptive cruise control (ACC). In addition to this, the driving assistance includes steering assistance (not shown) that performs steering control of the steering mechanism, which includes the steering wheel and the steering rod, independently of the operation of the steering wheel by the driver, and these operations can be controlled by a driving assistance device which includes the functions of the brake assistance device.

Figure 2:
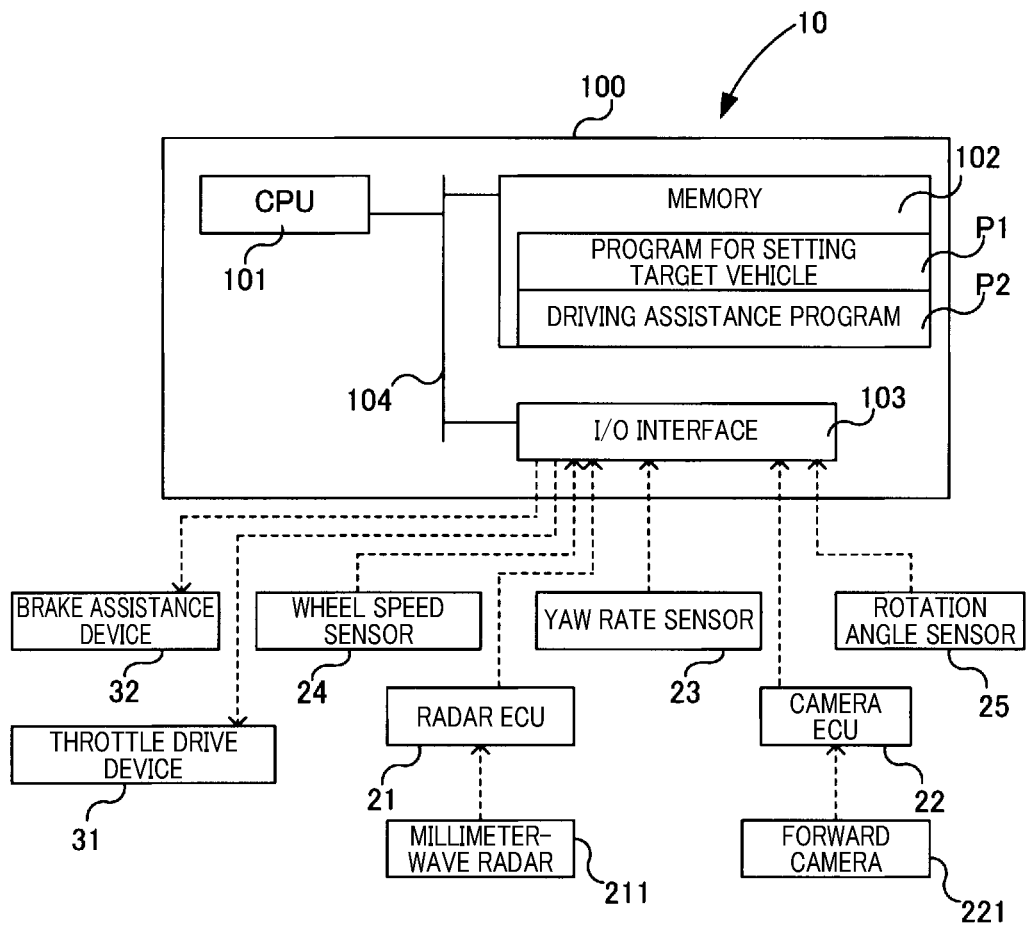
FIG. 2 is a block diagram showing a functional configuration of a control device included in the device for setting a target vehicle according to the first embodiment.

As shown in FIG. 2, the control device 100 includes a central processing unit (CPU) 101, a memory 102, an I/O interface 103, and a bus 104. The CPU 101, the memory 102, and the I/O interface 103 are connected via the bus such that bidirectional communication is possible. The memory 102 includes a non-volatile and read-only memory, such as a ROM, that stores a program for setting a target vehicle P1 to be subjected to driving assistance control of a host vehicle and a program for driving assistance P2 for executing driving assistance control, and a memory which is readable/writable by the CPU 101, such as a RAM. As described below, the memory 102 can further store a flag indicating that a movement history exists and a flag indicating that an FSN history exists. The CPU 101 functions as a setting control unit by expanding and executing the program for setting a target vehicle P1 stored in the memory 102 in the readable/writable memory, and functions as a driving assistance control unit by similarly executing the program for driving assistance P2. The CPU 101 may be a single CPU, a plurality of CPUs that execute each program, or a multi-threading CPU capable of simultaneously executing a plurality of programs.

The radar ECU 21, the camera ECU 22, the yaw rate sensor 23, the wheel speed sensor 24, the rotation angle sensor 25, the throttle drive device 31, and the brake assistance device 32 are each connected to the I/O interface 103 via control signal lines. Detection signals are input from the radar ECU 21, the camera ECU 22, the yaw rate sensor 23, the wheel speed sensor 24, the rotation angle sensor 25, a control signal that controls the opening level of the throttle valve is output to the throttle drive device 31, and a control signal that controls the braking level is output to the brake assistance device 32. The I/O interface 103 can be referred to as a detection signal acquisition unit capable of acquiring a first detection signal and a second detection signal.

The millimeter-wave radar 211 is a sensor that detects the distance, relative speed, and angle of an object by emitting a millimeter wave and receiving a reflected wave reflected by the object. In the present embodiment, the millimeter-wave radar 211 is disposed on the center and on both sides of the front bumper 520. An unprocessed detection signal output from the millimeter-wave radar 211 is processed by the radar ECU 21, and input to the control device 100 as a first detection signal composed of a point or a sequence of points representing one or more representative positions on the object. Alternatively, in the absence of the radar ECU 21, a signal representing an unprocessed received wave may be supplied from the millimeter-wave radar 211 to the control device 100 as the first detection signal. When an unprocessed received wave is used as the detection signal, the control device 100 executes signal processing for specifying the position and distance of the object.

The forward camera 221 is an imaging device provided with a single imaging element such as a CCD, and is a sensor that, as a result of receiving visible light, outputs external shape information relating to an object as image data, which is the detection result. The image data output from the forward camera 221 is subjected to feature point extraction processing in the camera ECU 22, and patterns representing the extracted feature points are compared with that of an object prepared in advance to be set as a control subject, that is, with a comparison patterns representing the external shape of a vehicle, and a frame image which includes the identified object is generated if the extracted patterns and the comparison patterns coincide, or are similar. On the other hand, if the extracted patterns and the comparison patterns do not coincide or are not similar, that is, are dissimilar, no frame image is generated. If a plurality of object is included in the image data, the camera ECU 22 generates a plurality of frame images including each of the identified object, which are then input to the control device 100 as second detection signals. Each frame image is represented by pixel data, and includes position information, that is, coordinate information, of the identified object. The number of frame images that can be included in a detection signal depends on the bandwidth between the camera ECU 22 and the control device 100. The unprocessed image data captured by the forward camera 221 may be input to the control device 100 as a second detection signal without separately providing the camera ECU 22. In this case, the control device 100 may identify the object using the external shape pattern of the object. In the present embodiment, the forward camera 221 is disposed on an upper portion of the center of the windscreen 510. The pixel data output from the forward camera 221 is monochrome pixel data or color pixel data. When it is desirable for an object other than a vehicle to be set as a control subject, an external pattern of the desired object is prepared, and the camera ECU 22 may output a frame image including the desired object as a detection signal. In this case, a frame image suitable for processing may be selectively used in the subsequent processing in the control device 100.

The yaw rate sensor 23 is a sensor that detects the rotational angular velocity of the vehicle 500. The yaw rate sensor 23 is disposed, for example, in a central portion of the vehicle. The detection signal output from the yaw rate sensor 23 is a voltage value which is proportional to the rotation direction and the angular velocity.

The wheel speed sensor 24 is a sensor that detects the rotational speed of the wheel 501, and is provided on each wheel 501. The detection signal output from the wheel speed sensor 24 is a voltage value proportional to the wheel speed or a pulse wave having an interval corresponding to the wheel speed. Information such as the vehicle speed and the travel distance of the vehicle can be acquired using the detection signal from the wheel speed sensor 24.

The rotation angle sensor 25 is a torque sensor that detects a torsion amount generated in the steering rod by steering of the steering wheel 504, that is, a steering torque. In the present embodiment, the rotation angle sensor 25 is provided on the steering rod that connects the steering wheel 504 and the steering mechanism. The detection signal output from the rotation angle sensor 25 is a voltage value proportional to the torsion amount.

The throttle drive device 31 is an actuator such as a stepping motor for adjusting the opening level of the throttle valve and controlling the output of the internal combustion engine ICE in response to an accelerator pedal operation by the driver, or irrespective of an accelerator pedal operation by the driver. A driver that controls the operation of the actuator based on a control signal from the CPU 101 is mounted on the throttle drive device 31. In the present embodiment, the throttle drive device 31 is provided in an air intake manifold, and increases or decreases the amount of air taken in by the internal combustion engine ICE according to a control signal from the control device 100.

The brake assistance device 32 is an actuator for realizing braking by the braking device 502 irrespective of a brake pedal operation by the driver. A driver that controls the operation of the actuator based on a control signal from the CPU 101 is mounted on the brake assistance device 32. In the present embodiment, the brake assistance device 32 is provided on the brake lines 503, and the hydraulic pressure in the brake lines 503 is increased or decreased according to a control signal from the control device 100. The brake assistance device 32 is constituted by a module including, for example, an electric motor and a hydraulic piston driven by the electric motor. Alternatively, a brake control actuator already introduced as a side slip prevention device or antilock braking system may also be used.

Figure 3:
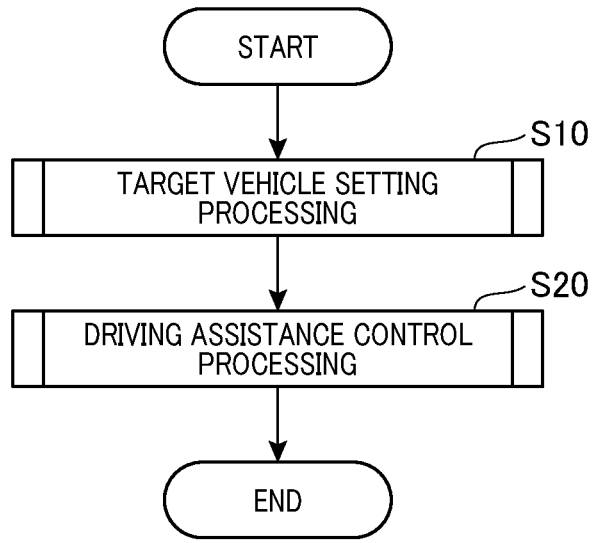
FIG. 3 is a flowchart showing a process flow of target vehicle setting processing and driving assistance control processing; which are executed by the device for setting a target vehicle according to the first embodiment.

The target vehicle setting processing and the driving assistance control processing, which are executed by the device for setting a target vehicle 10 according to the first embodiment, will be described. The processing routine shown in FIG. 3 is repeatedly executed at predetermined time intervals, for example, from the start to the stop of the control system of the vehicle, or when a start switch is switched on until the start switch is switched off. The target vehicle setting processing S10 is executed when the CPU 101 executes the program for setting a target vehicle P1, and the driving assistance control processing S20 is executed when the driving assistance control program P2 is executed. In FIG. 3, the target vehicle setting processing S10 and the driving assistance control processing S20 are included in the same processing flow in order to simplify the description, but the target vehicle setting processing S10 and the driving assistance control processing S20 are processes that may be independently executed with separate timings. The driving assistance control processing S20 includes, for example, constant travel speed/inter-vehicle distance control processing, braking support processing, and steering support processing. The braking support processing includes sudden braking and gentle braking for avoiding a collision with the target vehicle, and the steering assistance processing includes steering for avoiding a collision with the target vehicle and steering for preventing lane departure.

Figure 4:
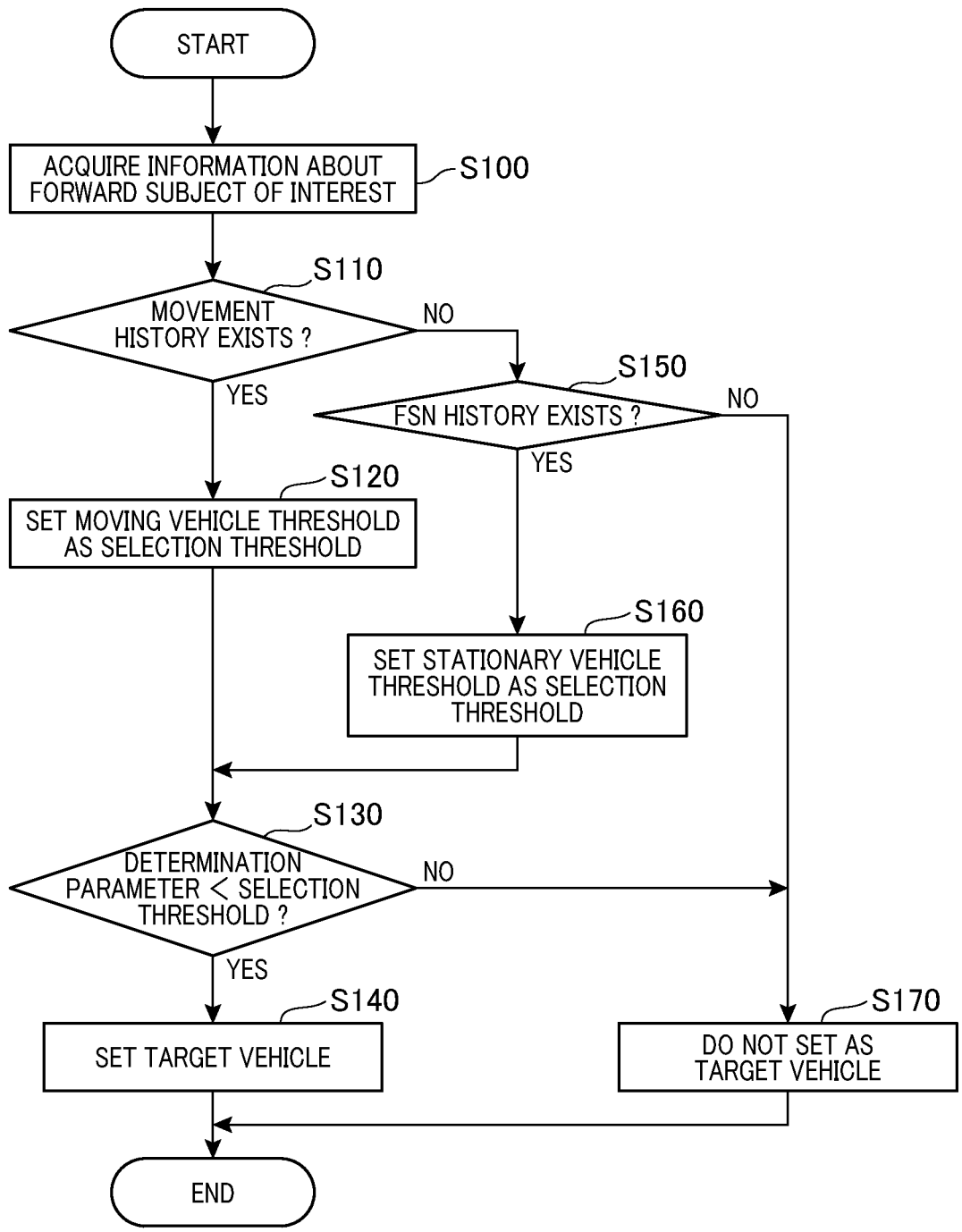
FIG. 4 is a flowchart showing a process flow of the target vehicle setting processing as the first embodiment.
Figure 5:
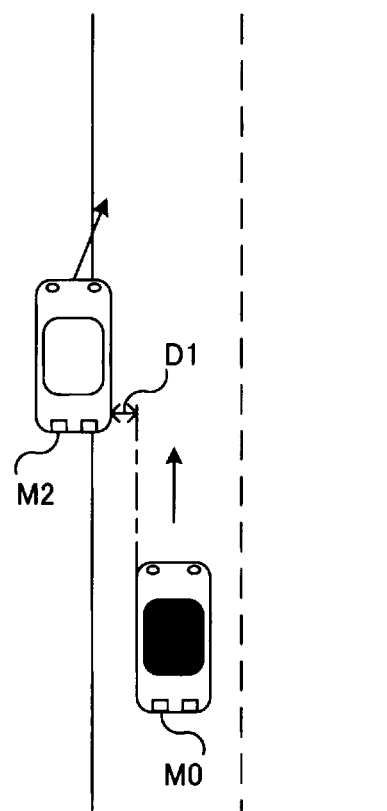
FIG. 5 is an explanatory diagram showing the relationship between a host vehicle and a forward object; and describes a relative lateral distance that serves as a first determination parameter.

The target vehicle setting processing S10 as the first embodiment will be described in detail with reference to FIG. 4 to FIG. 6. The flowchart shown in FIG. 4 is repeatedly executed at predetermined time intervals. The CPU 101 acquires attribute information about a forward object via the radar ECU 21 and the camera ECU 22 (step S100). Because the forward object is subjected to a determination, it can also be referred to as a determination object. The CPU 101 determines whether the object detected by the millimeter-wave radar 211 has moved each time a piece of information about the forward object is acquired, and associates with the detected object a movement history that indicates the existence of movement. Specifically, after the present processing routine is started for the first time, the CPU 101 determines, with respect to an object detected for the first time by the millimeter-wave radar 211, the presence of movement of the object based on a change in the relative speed and in the position coordinates of the reflection points corresponding to the target at each acquisition timing. For example, if the CPU 101 determines that the subject is moving, it associates a flag indicating that a movement history exists, which is indicative of a mobile object, and when the CPU 101 identifies that the object is not moving, it associates a flag indicating that no movement history exists, which is indicative of a stationary object. Further, the CPU 101 uses the detection signal input from the radar ECU 21 and the detection signal input from the camera ECU 22 to perform data fusion processing, that is, data integration processing or join processing, which improves the system for determining whether the object is a vehicle. Specifically, the CPU 101 performs integration if the position coordinates of the reflection points representing the object input from the radar ECU 21, and the detection signal input from the camera ECU 22, that is, the position coordinates of the identified vehicle included in the image frame, are to be associated, and associates with the object a flag indicating that a fusion (FSN) history exists, that is, that a combination history exists, which indicates that the object has been identified as a vehicle. On the other hand, if a vehicle corresponding to the position coordinates of the reflection points representing the object does not appear in the image frame and the association cannot be performed, a flag indicating that no fusion history exists is associated with the object. An object which is associated with a flag indicating that an FSN history exists represents a stationary vehicle which has been identified as a vehicle through vehicle identification by pattern matching, and an object which is associated with a flag indicating that no FSN history exists represents an unknown stationary object whose object type has not been specified. If a plurality of forward object could exist, then the detection signals input from the radar ECU 21 and the camera ECU 22 may include a plurality of object, and therefore, data fusion processing is executed with respect to each object. The detection of an object using the millimeter-wave radar 211 is not easily affected by forward obstacles, weather, or the like, and therefore, the object may sometimes not be detected by the forward camera 221 despite the object being detected by the millimeter-wave radar 211, and data fusion processing cannot be executed in such cases. The movement history flag and the FSN history flag are initialized every time the system of the vehicle 500 is activated, that is, reset to the no movement history and no FSN history states.

The CPU 101 determines whether a flag indicating that a movement history exists is associated with the forward object whose information was acquired in step S100, or whether the forward object is a mobile object which is currently moving (step S110). In the present embodiment, in order to avoid redundancy of description, when the forward object is referred to as being associated with a flag indicating that a movement history exists, this collectively includes those cases the forward object is a mobile object. If the forward object is associated with a flag indicating that a movement history exists (step S110: Yes), the CPU 101 sets a moving vehicle threshold Dr1 as the selection threshold Dr of the first determination parameter used in step S130 to assess whether to perform the setting as the target vehicle (step S120). That is, even if the forward object is a stationary object, a moving vehicle threshold is set as a selection threshold if it is associated with a flag indicating that a movement history exists. When the CPU 101 sets the selection threshold, the process proceeds to step S130. As shown in FIG. 5, the first determination parameter used in step S130 is a relative lateral distance D1 of the forward vehicle M2 with respect to the host vehicle M0, and the selection threshold Dr is the threshold of the relative lateral distance D1.

The CPU 101 calculates the relative lateral distance D1 of the forward vehicle M2 with respect to the host vehicle M0, and uses the moving vehicle threshold Dr1 which has been set to determine whether D1 is less than Dr1, that is, whether the first determination parameter is less than the selection threshold (step S130). For example, the relative lateral distance D1 between the forward vehicle M2 and the host vehicle M0 can be calculated using the position coordinates of a reflection point on an end portion of the forward vehicle M2 on the host vehicle M0 side input from the radar ECU 21 and an end point of the host vehicle on the forward vehicle M2 side, and then taking the difference as the separation amount. Alternatively, it may be calculated using the positional coordinates of an end point of the forward vehicle M2 on the host vehicle M0 side obtained from an image frame input from the camera ECU 22 that includes the forward vehicle M2, and then taking the difference as the separation amount.

If the CPU 101 determines that D1 is less than Dr1 (step S130: Yes), it sets the forward vehicle M2 as the target vehicle (step S140), and the present processing routine ends. If the CPU 101 determines that D1 is not less than Dr1 (step S130: No), it does not set the forward vehicle M2 as the target vehicle (step S170), and the present processing routine ends.

If a flag indicating that a movement history exists is not associated with the forward object (step S110: No), the CPU 101 determines whether a flag indicating that an FSN history exists is associated with the forward object (step S150). It is determined whether the forward object has been subjected to data fusion processing even once since the start of detection by the millimeter-wave radar 211 and the forward camera 221, that is, has been determined as a stationary vehicle as a result of data fusion processing. If a flag indicating that an FSN history exists is not associated with the forward object (step S150: No), the CPU 101 does not set the forward vehicle M2 as a target vehicle (step S170), and the present processing routine ends.

If the forward object is associated with a flag indicating that an FSN history exists (step S150: Yes), the CPU 101 sets the selection threshold Dr of the first determination parameter used when setting the target vehicle as a stationary vehicle threshold Dr2 (step S160). A stationary vehicle threshold Dr2 is set to a value that makes it less likely for a stationary vehicle to be selected as the target vehicle than a moving vehicle. In the present embodiment, because a distance difference between the forward vehicle M2 and the host vehicle M0 is used as the first determination parameter, the stationary vehicle threshold Dr2 is set to a smaller value than the moving vehicle threshold Dr1, and the moving vehicle threshold Dr1 is greater than the stationary vehicle threshold Dr2. That is, if the forward vehicle M2 is a stationary vehicle, it is only determined to be the target vehicle when the distance difference between the forward vehicle M2 and the host vehicle M0 becomes small, which makes it less likely to be selected as the target vehicle than a moving vehicle. A value is used for the stationary vehicle threshold Dr2 that makes it less likely for a stationary vehicle to be selected as the target vehicle than a moving vehicle because, compared to a moving vehicle or a case where a movement history exists, the likelihood of a stationary vehicle unexpectedly starting to move is low, and therefore, setting as the target vehicle and implementing driving assistance control would lead to excessive implementation of the driving assistance control. If an overlap amount that represents the extent of overlap between the forward vehicle M2 and the host vehicle M0 is used as the first determination parameter, the stationary vehicle threshold Dr2 is set to a larger value than the moving vehicle threshold Dr1. In this case, if the forward vehicle M2 is a stationary vehicle, it is only determined to be the target vehicle when the overlap amount between the forward vehicle M2 and the host vehicle M0 becomes large, which makes it less likely to be selected as the target vehicle than a moving vehicle. This is because, even if the overlap amount is large between the forward vehicle M2, which is a stationary vehicle, and the host vehicle M0, the likelihood of a collision or contact between the host vehicle M0 and the forward vehicle M2 is low relative to the case of a moving vehicle.

The CPU 101 calculates the relative lateral distance D1 of the forward vehicle M2 with respect to the host vehicle M0, and uses the stationary vehicle threshold Dr2 that has been set to determine whether D1 is less than Dr2, that is, whether the first determination parameter is less than the selection threshold (step S130). If the CPU 101 determines that D1 is less than Dr2 (step S130: Yes), it sets the forward vehicle M2 as the target vehicle (step S140), and the present processing routine ends. If the CPU 101 determines that D1 is not less than Dr2 (step S130: No), it does not set the forward vehicle M2 as a target vehicle (step S170), and the present processing routine ends.

According to the device for setting a target vehicle 10 of the first embodiment, different selection thresholds are used to determine whether to set the target vehicle when the forward object is associated with a flag indicating that a movement history exists, and when the forward object is not associated with a movement history but is associated with a flag indicating that an FSN continuation history exists. Therefore, the target vehicle can be appropriately set according to whether the forward object is a stationary vehicle or a moving vehicle, and further, driving assistance control can be appropriately executed.

Figure 6:
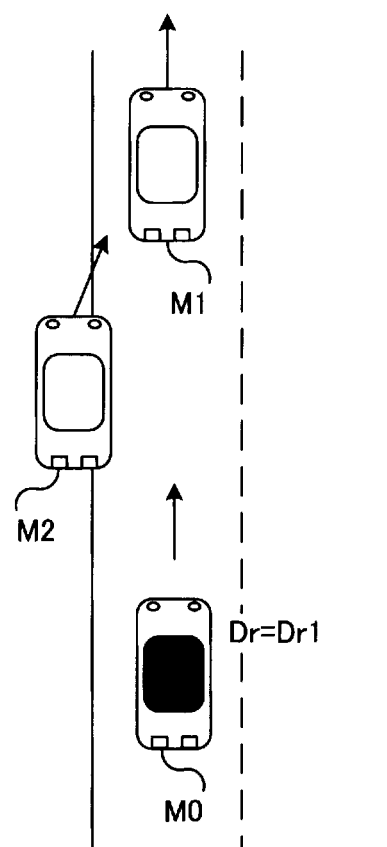
FIG. 6 is an explanatory diagram showing the relationship between a host vehicle and a forward object when a moving vehicle threshold is set as the selection threshold of the first determination parameter.
Figure 7:
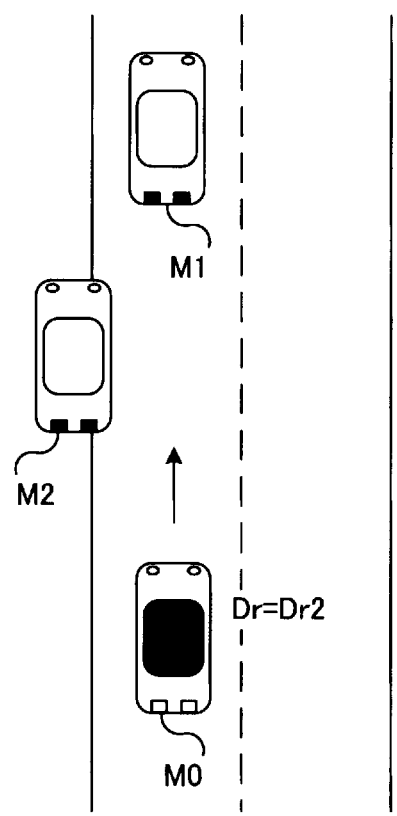
FIG. 7 is an explanatory diagram showing the relationship between a host vehicle and a forward object when a stationary vehicle threshold is set as the selection threshold of the first determination parameter.

This will be specifically described using FIG. 6 and FIG. 7. For example, the example shown in FIG. 6 corresponds to a case where, for example, the forward vehicles M1 and M2 were both initially traveling in a lane, and the forward vehicle M2 has then stopped on the shoulder of the road. In this case, the forward vehicle M2 is associated with a flag indicating that a movement history exists. For example, in the example shown in FIG. 7, the forward vehicle M2 is stopped on the shoulder of the road from the start of detection by the millimeter-wave radar 211 and the forward camera 221, and is further associated with a flag indicating that an FSN history exists. In this case, the forward vehicle M2 is recognized as a stationary vehicle. The forward vehicles M1 and M2 shown in FIG. 6 are set as vehicles necessitating control, and driving assistance control is executed with respect to the forward vehicles M1 and M2 according to the distance from the host vehicle M0, the relative speed, or the like. In FIG. 7, because the forward vehicle M1, which exists on the travel trajectory of the host vehicle M0, is in a stationary state after moving and has a movement history, it is set as the target vehicle, while the forward vehicle M2 is not set as the target vehicle because is a stationary vehicle having an FSN history. Therefore, driving assistance control is not executed when the host vehicle M0 approaches and passes the forward vehicle M2, and excessive execution of driving assistance control is inhibited. As a result, smooth vehicle travel can be realized, and control assistance unintended by the driver, that is, deceleration and steering assistance, are not executed, and the driver does not experience discomfort. When the term "travel trajectory" is used in relation to the forward vehicle M2, the travel trajectory refers to the planned travel trajectory of the host vehicle M0.

In the first embodiment, the processing that sets the target vehicle in step S140 more specifically includes a step that determines a plurality of candidates for the target vehicle, and a step that sets, from among the plurality of candidates for the target vehicle, one candidate for the target vehicle as the target vehicle. That is, if a plurality of forward object exist and a plurality of forward object have a movement history or an FSN history, a plurality of candidates for the target vehicle can be determined. For example, the setting of a single target vehicle is executed on the condition that it has the shortest distance to the host vehicle among the plurality of candidates for the target vehicle, and has the highest relative speed with respect to the host vehicle, and then the forward object that has been set, which is a candidate for the target vehicle, is associated with a flag indicating that it is the target vehicle. This processing content can be similarly applied to each of the following embodiments.

Second Embodiment

Figure 8:
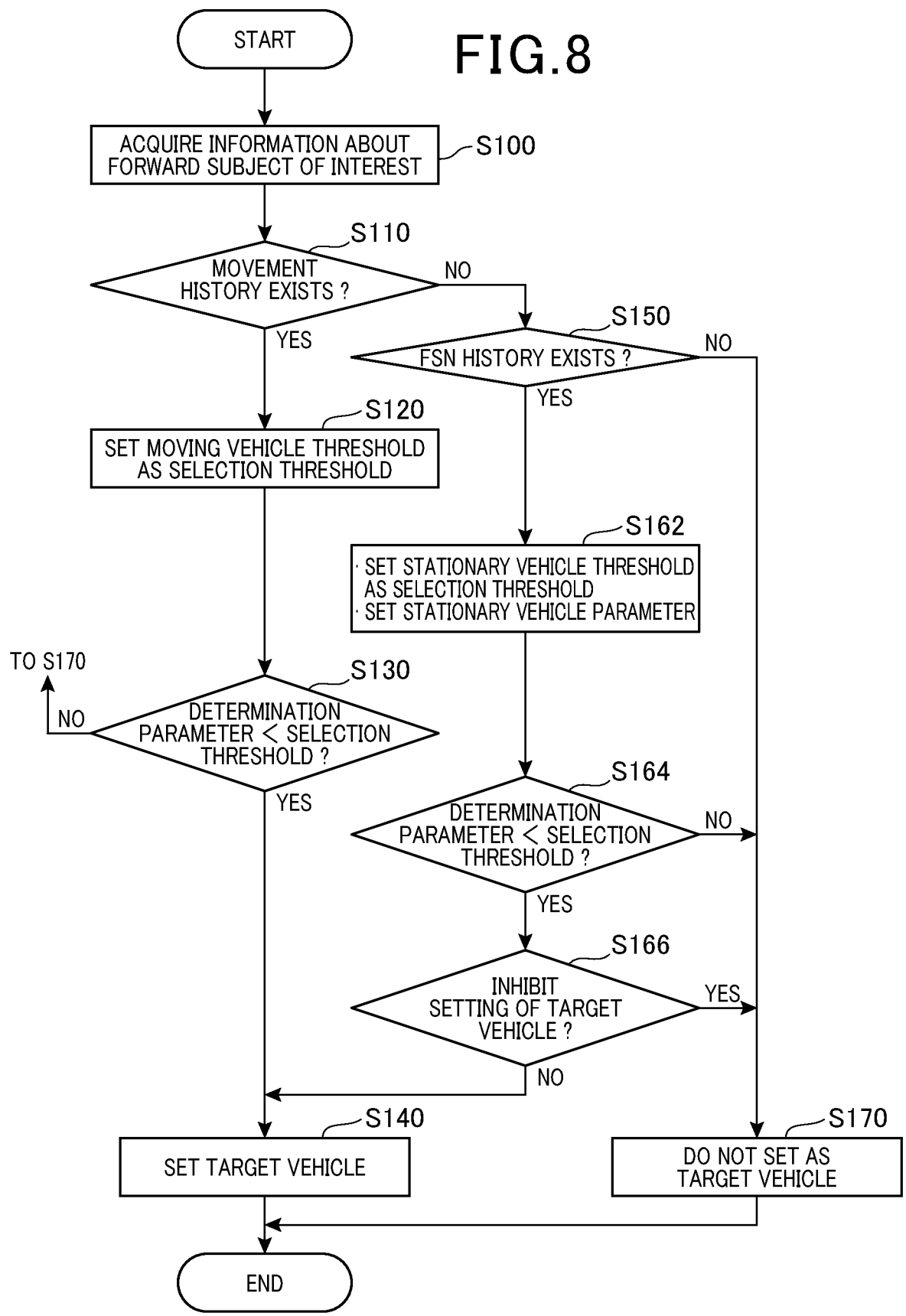
FIG. 8 is a flowchart showing a process flow of the target vehicle setting processing as a second embodiment.

A target vehicle setting processing as a second embodiment, which is executed by the device for setting a target vehicle 10, will be described with reference to FIG. 8 to FIG. 15. The configurations of the vehicle 500, the device for setting a target vehicle 10, and the system for setting a target vehicle are the same as the configurations of the first embodiment, and therefore, the same reference numerals are given and the description is omitted. Furthermore, the same processing steps as those of the target vehicle setting processing as the first embodiment are given the same step numbers, and the description is omitted. The flowchart shown in FIG. 8 is repeatedly executed at predetermined time intervals in the same manner.

The CPU 101 executes step S100 and step S110. If it is determined that the forward object is associated with a movement history flag (step S110: Yes), the CPU 101 sets the moving vehicle threshold Dr1 as the selection threshold of the first determination parameter in step S120, and the process proceeds to step S130. If the CPU 101 determines that D1 is less than Dr1 (step S130: Yes), it sets the forward vehicle M2 as the target vehicle (step S140), and the present processing routine ends. If the CPU 101 determines that D1 is not less than Dr1 (step S130: No), it sets the forward vehicle M2 as the target vehicle (step S170), and the present processing routine ends.

If a flag indicating that a movement history exists is not associated with the forward object (step S110: No), the CPU 101 determines whether a flag indicating that an FSN history exists is associated with the forward object (step S150), and if a flag indicating that a FSN history exists is not associated with the forward object (step S150: No), the forward vehicle M2 is not set as the target vehicle (step S170), and the present processing routine ends.

If the forward object is associated with a flag indicating that an FSN history exists (step S150: Yes), the CPU 101 sets the stationary vehicle threshold Dr2 as the selection threshold Dr of the first determination parameter used when setting the target vehicle, and sets at least one stationary vehicle parameter (step S162). The stationary vehicle parameter is an additional parameter which is different from the first parameter which is used to determine whether to set a stationary vehicle as the target vehicle.

At least one of the following parameters may be used as the additional parameter.

Figure 9:
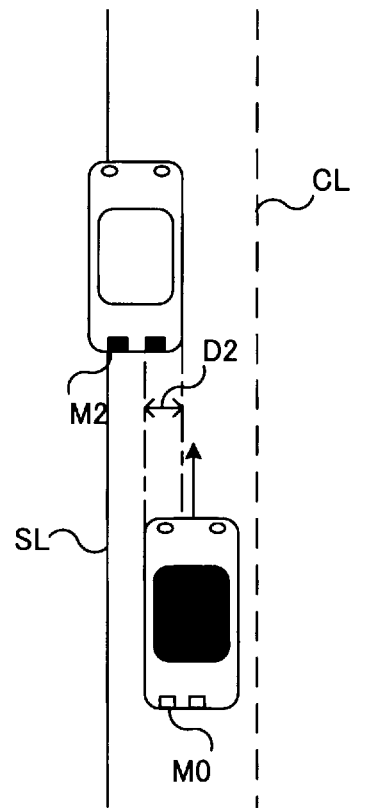
FIG. 9 is an explanatory diagram showing the relationship between a host vehicle and a forward object; and describes an overlap parameter that serves as an additional parameter.

(1) An overlap parameter as shown in FIG. 9, which represents an overlap amount D2 between a forward vehicle M2, which straddles a shoulder lane SL and is stationary on the shoulder of the road, and a host vehicle M0. The selection threshold of the overlap amount D2 uses, for example, a value of zero or more, that is, at least a value in which the host vehicle M0 would make contact or collide with the forward vehicle M2, which is a stationary vehicle, if it proceeds as is. That is, if there is no possibility of a collision between the forward vehicle M2, which is a stationary vehicle, and the host vehicle M0, the forward vehicle M2 is not set as the target vehicle. The overlap amount D2 between a stationary vehicle and the host vehicle M0 is acquired, for example, using the position coordinates of a reflection point on an end portion of the forward vehicle M2 on the host vehicle M0 side input from the radar ECU 21 and an end point of the host vehicle on the forward vehicle M2 side, and then calculating the difference as the overlap amount. Alternatively, it may be acquired using the positional coordinates of an end point of the forward vehicle M2 on the host vehicle M0 side obtained from an image frame input from the camera ECU 22 that includes the forward vehicle M2, and then calculating the difference as the overlap amount. In this case, as described above, the stationary vehicle threshold Dr2 is set to a larger value than the moving vehicle threshold Dr1. Alternatively, it may be calculated as a white line overlap amount, which indicates how much the forward vehicle M2 is protruding from the shoulder line SL, or as a white line lap parameter, which represents a white line lap ratio. Specifically, a difference distance between the position coordinates of the center of the shoulder line SL and an end point of the forward vehicle M2 on the host vehicle M0 side is calculated as the white line overlap amount. The white line lap ratio is calculated, for example, as a ratio of the white line overlap amount to the vehicle width of the forward vehicle M2. The selection threshold of the white line overlap amount or white line lap ratio may use a value with respect to the lane width that could cause a collision between the forward vehicle M2, which is a stationary vehicle, and the host vehicle M0, such as a value of 1 m or more for the selection threshold of the white line overlap amount, or a value of 50% or more for the selection threshold of the white line lap ratio.

Figure 10:
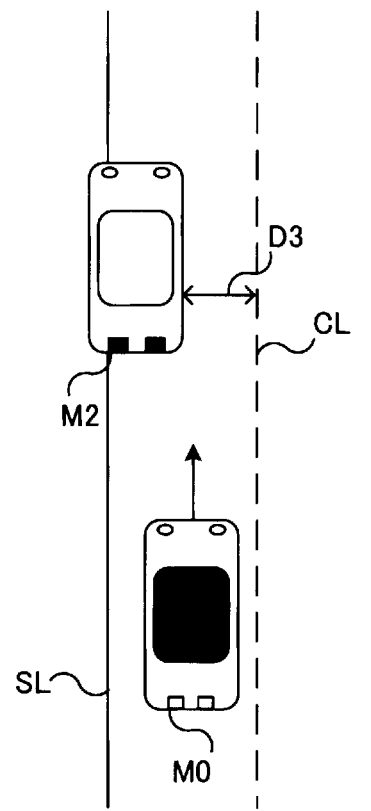
FIG. 10 is an explanatory diagram showing the relationship between a host vehicle and a forward object; and describes a protrusion parameter that serves as an additional parameter.

(2) A protrusion parameter as shown in FIG. 10, which indicates how much a forward vehicle M2, which is straddling the shoulder line SL and is stationary on the shoulder of the road, protrudes onto the planned travel trajectory of the host vehicle M0. The protrusion parameter is a parameter in which a determination element, which relates to whether a collision with the forward vehicle M2 inside the d lane can be avoided, is added to the overlap parameter using road marking information, such as a white line/yellow line CL serving as a center line, and a shoulder line SL, which represents the detection signal from the camera ECU 22. The selection threshold of the protrusion parameter uses, in addition to the overlap amount D2 selection threshold, a clearance amount D3 selection threshold, which is obtained using the position coordinates of the white line CL and the position coordinates of the end portion of the forward vehicle M2 on the host vehicle M0 side, and then calculates the difference as the separation amount. The clearance amount D3 selection threshold uses, for example, a value which is larger than the vehicle width of the host vehicle M0 that would enable the host vehicle M0 to proceed as is, but avoid the forward vehicle M2 without crossing the center line CL. That is, if there is no possibility of a collision between the forward vehicle M2, which is a stationary vehicle, and the host vehicle M0 without the host vehicle M0 crossing the center line CL, the forward vehicle M2 is not set as the target vehicle.

When the CPU 101 sets the selection threshold, the process proceeds to step S164. The CPU 101 calculates the relative lateral distance D1 between the forward vehicle M2 and the host vehicle M0, and uses the stationary vehicle threshold Dr2 that has been set to determine whether the first determination parameter D1 is less than the selection threshold Dr2, and whether the additional parameters D2 and D3 are less than the selection threshold (step S164). If at least one of the first determination parameter D1 and the additional parameters D2 and D3 are less than the selection threshold, the CPU 101 proceeds to step S166 (step S164: Yes). If at least one of the first determination parameter D1 and the additional parameters D2 and D3 are less than the selection threshold, there is a possibility of contact or a collision with the stationary vehicle M2, and it is desirable for it to be set as the target vehicle of driving assistance control. If the first determination parameter D1 and the additional parameters D2 and D3 are all greater than or equal to the selection threshold (step S164: No), the CPU 101 executes step S170 and ends the present processing routine.

In step S166, the CPU 101 determines whether the setting of the stationary vehicle M2 as a target vehicle should be inhibited based on the behavior of the host vehicle M0. Inhibiting the setting refers to inhibiting the setting of a target vehicle even when it is determined that the target vehicle should be set based on the determination parameters in step S164, and consequently not setting the target vehicle. Hereinafter, specific examples will be described.

Figure 11:
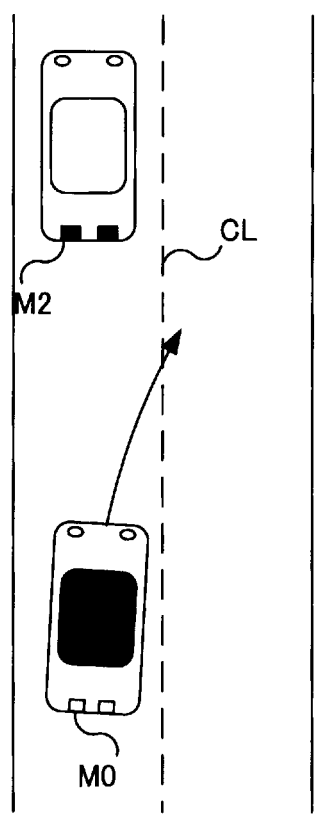
FIG. 11 is an explanatory diagram showing the relationship between a host vehicle and a forward object in a case where the setting of the target vehicle is inhibited.

(3) As shown in FIG. 11, if the host vehicle M0 may perform a course change to separate from the stationary vehicle M2, or is executing a course change, the CPU 101 determines that the stationary vehicle M2 is not to be set as the target vehicle or included as a candidate for the target vehicle (step S166: No), executes step S170, and ends the present processing routine. Using the white line CL detection signal from the camera ECU 22, it is possible to add as a determination condition a case where the host vehicle M0 could change course, or is currently changing course, so as to cross the white line CL, that is, a boundary line of the current lane, in a direction that causes separation from the stationary vehicle M2. In this case, it is assumed that the host vehicle M0, that is, the driver, is executing an avoidance operation to avoid the stationary vehicle M2, and therefore, if the stationary vehicle M2 is set as the target vehicle, unnecessary driving assistance control is executed, which may cause the smooth driving of the host vehicle M0 to become hindered as a result of rejection of the avoidance operation by the driver, thereby resulting in discomfort to the driver. Therefore, the occurrence of these problems can be prevented by not setting the stationary vehicle M2 as the target vehicle in a case where the host vehicle M0 may change course, or is currently changing course, to separate from the stationary vehicle M2.

Figure 12:
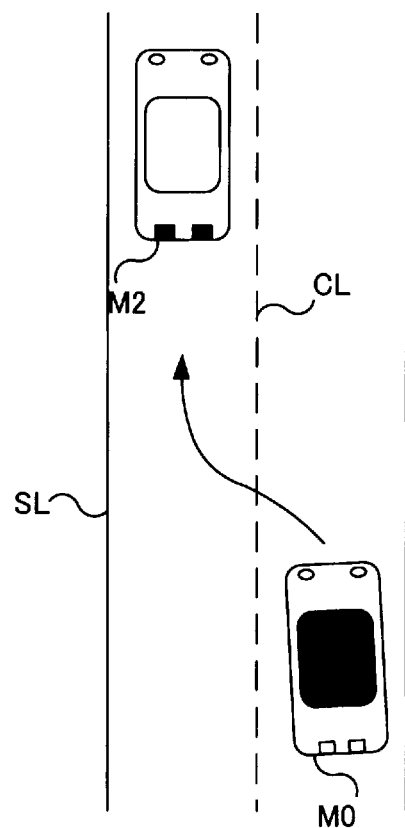
FIG. 12 is an explanatory diagram showing the relationship between a host vehicle and a forward object in a case where the setting of the target vehicle is not inhibited.
Figure 13:
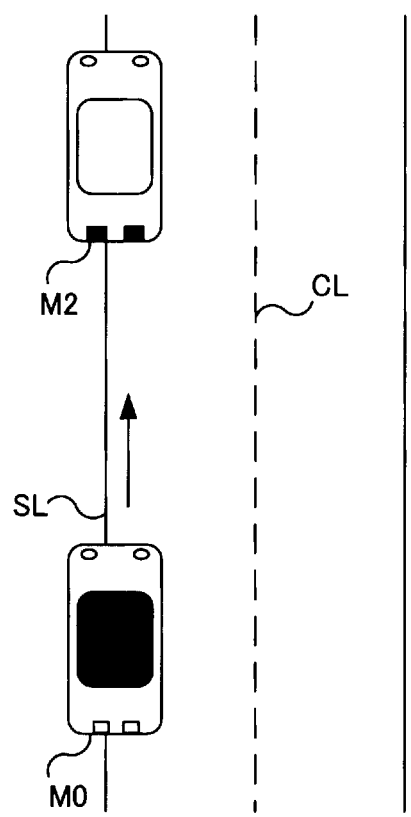
FIG. 13 is an explanatory diagram showing the relationship between a host vehicle and a forward object in a case where the setting of the target vehicle is not inhibited.

(4) As shown in FIG. 12, if the host vehicle M0 may change course, or is currently changing course, so as to approach the stationary vehicle M2, the CPU 101 determines the stationary vehicle M2 is to be set as the target vehicle or is included as a candidate for the target vehicle (step S166: Yes), then executes step S140, and ends the present processing routine. Using the white line CL detection signal from the camera ECU 22, it is possible to add as determination conditions a case where the host vehicle M0 has crossed the white line CL that divides the current lane, that is, the host vehicle M0 is currently traveling in the same lane as the stationary vehicle M2, and a case where, as shown in FIG. 13, the stationary vehicle M2, which has stopped on the shoulder of the road, is straddling the same shoulder line SL as the host vehicle M0. In this case, the host vehicle M0, that is, the driver, has approached the stationary vehicle M2, and the execution of driving assistance control is desired. Therefore, if a course change that may cause the host vehicle M0 to approach the stationary vehicle M2 may be performed, or if a course change is being performed, the stationary vehicle M2 is set as the target vehicle such that contact or a collision between the stationary vehicle M2 and the host vehicle M0 is inhibited or avoided. If a course change that may cause the host vehicle M0 to approach the stationary vehicle M2 may be performed, or if a course change is being performed, the stationary vehicle M2 is excluded from being set as the target vehicle when three or more travel lanes exist, the stationary vehicle M2 is present in the lane closest to the shoulder of the road, and the host vehicle M0 is performing a course change from the center lane to the lane which is second closest to the shoulder of the road. This is because, in this case, the host vehicle M0 has not planned to perform a course change to the rear of the stationary vehicle M2, and setting the stationary vehicle M2 as the target vehicle would cause driving assistance control to be executed, thereby hindering the smooth travel of the host vehicle M0.

The possibility of a course change that causes the host vehicle M0 to approach or separate from the stationary vehicle M2, or the execution of a course change, may be determined, for example, from the orientation of the host vehicle M0 using the detection signal from the yaw rate sensor 23, and the steering angle of the host vehicle M0 using the detection signal from the rotation angle sensor 25. In addition, if the driver operates the direction indicator, it is possible to determine that a course change may be performed by using an input signal from the direction indicator.

If driving assistance control is being executed in the host vehicle M0 with respect to a preceding vehicle which is currently moving, the CPU 101 may determine whether to inhibit the setting of forward object other than the preceding vehicle as the target vehicle. Specific examples will be described.

Figure 14:
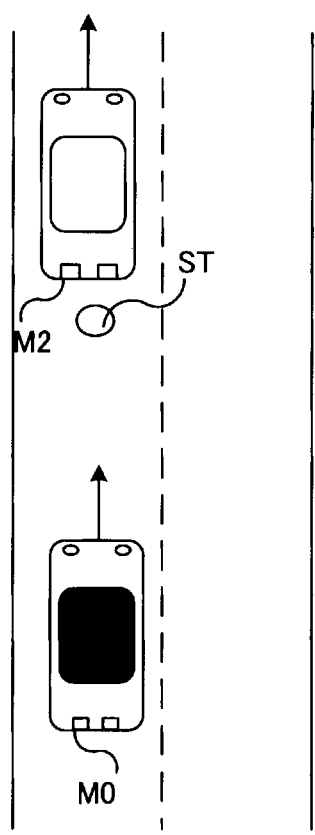
FIG. 14 is an explanatory diagram showing the relationship between a host vehicle and a forward object in a case where the setting of the target vehicle is inhibited while driving assistance control processing is being executed.

(5) As shown in FIG. 14, a forward object ST passed by the preceding vehicle M2, for which driving assistance control is currently being executed, is not to be set as the target vehicle or included as a candidate for the target vehicle (step S166: No), step S170 is executed, and the present processing routine ends. The forward object ST is assumed to be a manhole, and because the preceding vehicle M2 and the manhole ST are in close proximity when the preceding vehicle M2 passes by the manhole ST, the manhole ST may sometimes be determined to be a vehicle at the time of execution of fusion processing, and become associated with a flag indicating that an FSN history exists. In this case, if the manhole ST is set as the target vehicle, the host vehicle M0 executes inappropriate driving support such as braking, which hinders the smooth travel of the host vehicle M0. On the other hand, if the preceding vehicle M2 passed by the forward object, then the host vehicle M0 should also be capable of passing by it without causing a collision, and therefore, the manhole ST is inhibited from being set as the target vehicle.

Figure 15:
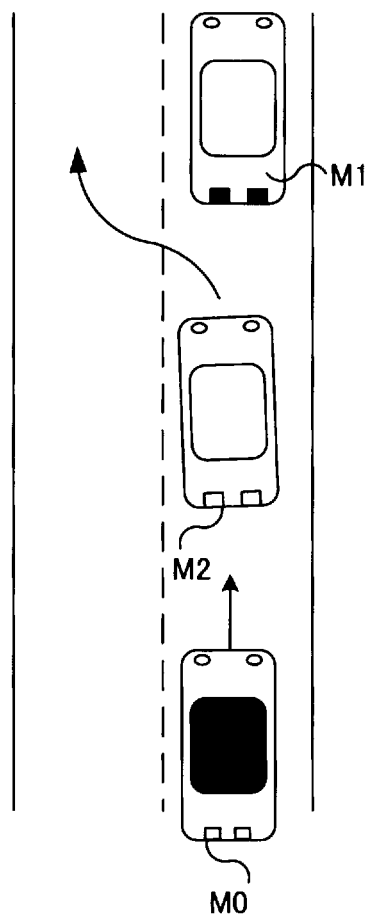
FIG. 15 is an explanatory diagram showing the relationship between a host vehicle and a forward object in a case where the setting of the target vehicle is not inhibited while driving assistance control processing is being executed.

(6) As shown in FIG. 15, when a forward object M1 associated with a flag indicating that an FSN history exists, which is detected at the time a course change is performed by a preceding vehicle M2 for which driving assistance control is currently being executed, is set as the target vehicle, or is included as a candidate for the target vehicle (step S166: Yes), step S140 is executed, and the present processing routine ends. That is, setting of the target vehicle is not inhibited. In this case, the forward object M1 is determined to be a stationary vehicle, and the forward object M1 is set as the target vehicle in order for a collision or contact between the forward object M1, which is a stationary vehicle, and the host vehicle M0 to be avoided or inhibited.

(7) In addition, if the lateral direction distance between a preceding vehicle M2, for which driving assistance control is currently being executed, and the host vehicle M0 is greater than or equal to a first reference value, it is determined that setting of the target vehicle is not to be inhibited (step S166: Yes), step S140 is executed, and the present processing routine ends. In this case, because the host vehicle M0 is not considered to be traveling on the same travel trajectory as the preceding vehicle M2, there is a possibility that, similarly to the preceding vehicle M2, the side of the forward object, which represents a stationary vehicle, which is closer to the host vehicle M0 than the preceding vehicle M2, cannot be passed. Therefore, the forward object is set as the target vehicle in order for a collision or contact between the forward object and the host vehicle M0 to be avoided or inhibited. The lateral direction distance is in the vehicle width direction of the host vehicle M0, or a direction that intersects with, or is orthogonal to, the direction of travel.

According to the target vehicle setting processing of the second embodiment, in addition to the advantages obtained from the target vehicle setting processing of the first embodiment, if a forward object is associated with a flag indicating that a movement history exists, that is, has been determined as a stationary vehicle, it is possible to determine whether to perform the setting as the target vehicle in more detail by using additional parameters. Therefore, if the forward object is a stationary vehicle, it can more appropriately be set as the target vehicle, and as a result, an appropriate driving assistance control can be executed with respect to a stationary vehicle that does not hinder the smooth travel of the host vehicle.

According to the target vehicle setting processing of the second embodiment, it is possible to further determine whether to inhibit the setting of a stationary vehicle as the target vehicle according to the behavior of the host vehicle. Therefore, a stationary vehicle can be more appropriately set as the target vehicle by taking the behavior of the host vehicle into consideration. As a result, it is possible to inhibit or prevent the execution of driving assistance control that results in discomfort to the driver, such as the execution of driving assistance control when the host vehicle is displaying behavior to avoid a stationary vehicle, or driving assistance control not being executed when the host vehicle is displaying behavior that brings it into close proximity to a stationary vehicle.

Further, according to the second embodiment, during execution of driving assistance control with respect to a preceding vehicle, which is the target vehicle, it is possible to further determine whether the setting of the forward object as a target vehicle is to be inhibited according to the relationship between the preceding vehicle and a forward object associated with a flag indicating that an FSN history exists. Therefore, the target vehicle can be smoothly switched according to the relationship between the preceding vehicle and the forward object. As a result, for example, it is possible to inhibit or prevent the execution of driving assistance control accompanied by braking or acceleration that results in discomfort to the driver.

In the second embodiment, the setting of the target vehicle may be inhibited by reducing the degree to which vehicles are set as the target vehicle. For example, by associating one or more coefficients with the behavior of the host vehicle with respect to the target vehicle, and not setting the target vehicle when the coefficient is greater than a determination threshold, the degree to which a forward object, which has been determined to be set as the target vehicle based on the stationary vehicle parameter, is set to the target vehicle is reduced. In particular, if a plurality of candidates for the target vehicle are selected based on the stationary vehicle parameter, by using a coefficient that takes into consideration the behavior of the host vehicle described above and the relationship between the host vehicle and the forward object, and a single forward object having the largest or smallest coefficient value is set as the target vehicle, the degree to which the other forward object are set as the target vehicle is reduced.

Third Embodiment

Figure 16:
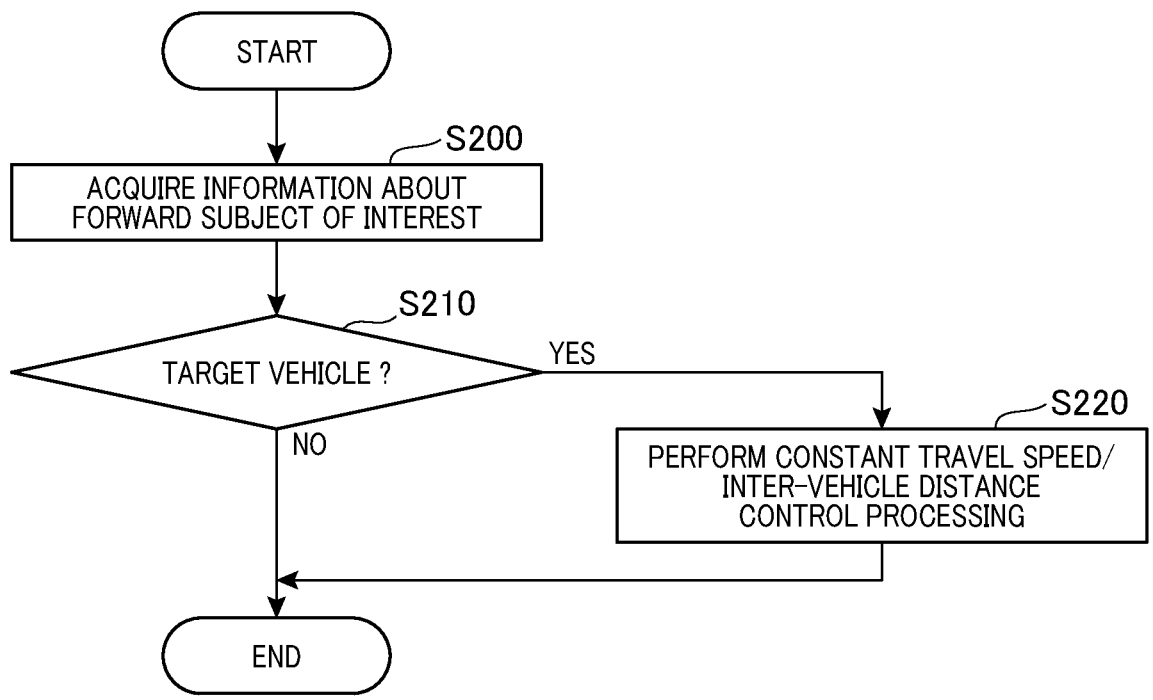
FIG. 16 is a flowchart showing a process flow of driving assistance control processing as a third embodiment.

Next, driving assistance control processing according to a third embodiment will be described with reference to FIG. 16. The driving assistance control processing is a detailed specific example of the driving assistance control processing in step S20 shown in FIG. 3, which executes constant travel speed/inter-vehicle distance control processing (ACC). The CPU 101 acquires information about a forward object (step S200). The information about the forward object is so-called attribute information acquired via the radar ECU 21 and the camera ECU 22. The CPU 101 uses the acquired information to determine whether the forward object is the target vehicle (step S210). The target vehicle is also referred to as a preceding vehicle. Whether the forward object is the target vehicle can be determined by a flag associated with the forward object when the target vehicle is set in the target vehicle setting processing described above.

If it is determined that the forward object is the target vehicle (step S210: Yes), the CPU 101 executes constant travel speed/inter-vehicle distance control processing (step S220), and ends the present processing routine. The constant travel speed/inter-vehicle distance control processing is realized as a result of the CPU 101, which executes the driving assistance control program P2, transmitting a throttle opening level instruction signal to the throttle drive device 31 such that a set speed is maintained, and further, transmitting a throttle opening level instruction signal to the throttle drive device 31 to maintain a preset inter-vehicle distance, and a braking instruction signal to the brake assistance device 32 to realize a required deceleration rate.

If it is determined that the forward object is not the target vehicle (step S210: No), the CPU 101 ends the present processing routine.

According to the driving assistance control processing of the third embodiment, because constant travel speed/inter-vehicle distance control processing is executed with respect to a forward object set as the target vehicle by the first and second embodiments, excessive braking and acceleration is inhibited, and collisions or contact between the forward object and the host vehicle can also be reduced or prevented. The execution of the constant travel speed/inter-vehicle distance control processing may be interrupted under conditions where the forward object cannot be decelerated and stopped by the constant travel speed/inter-vehicle distance control processing. In this case, emergency braking (EBA) may be executed as the driving assistance control. In the third embodiment, when braking assistance or steering assistance is executed as the driving assistance control processing, because deceleration, acceleration and steering support are executed with respect to a forward object which has been appropriately set, excessive execution of driving assistance control is inhibited, while also enabling collisions or contact between the forward object and the host vehicle to be reduced or prevented.

Other Embodiments (1) In the second embodiment, a forward object associated with a flag indicating that an FSN history exists may also be set as the target vehicle by further adding an arbitrary combination of additional conditions, including the speed of the host vehicle M0 being less than or equal to a specified value, a collision spare time TTC with a forward object associated with a flag indicating that an FSN history exists being less than or equal to a specified value, the distance from a forward object associated with a flag indicating that an FSN history exists being less than or equal to a specified value, and whether deceleration and stopping can be achieved by the driving assistance control. These conditions are conditions which enable collisions or contact with a forward object set as the target vehicle to be avoided or inhibited by executing the driving assistance control, or conditions that are expected to enable collisions or contact with a forward object set as a target vehicle to be avoided or inhibited by executing the driving assistance control. Therefore, by taking these conditions into consideration, it is possible to determine whether to set the forward object as the target vehicle from the perspective of the effectiveness of the driving assistance control.

(2) In the second embodiment, the order in which steps S164 and S166 are executed may be reversed. For example, if it is a priority determination condition to inhibit the setting of the target vehicle, step S166 may be executed first.

(3) In the embodiments described above, the CPU 101 executes the program for setting a target vehicle P1 and the program for driving assistance P2 to realize the setting control unit and driving assistance control by software, but these may also be realized by hardware by means of a pre-programmed integrated circuit or discrete circuit.

The present disclosure has been described above based on embodiments and modifications, however the embodiments of the invention described above are intended to facilitate an understanding of the present disclosure, and in no way limit the present disclosure. The present disclosure may be modified and improved without departing from the spirit and scope of the claims, and equivalents thereof are also included in the present disclosure. For example, the technical features in the embodiments and modifications that correspond to the technical features in each of the modes described in the Summary of the Invention section may be appropriately replaced or combined to solve some or all of the problems described above, or to achieve some or all of the effects described above. Furthermore, if the technical feature is not described as essential within the present specification, it can be eliminated as appropriate. For example, Application Example 1 represents the device for setting a target vehicle in a vehicle according to the first aspect described above.

Application Example 2: The device for setting a target vehicle according to Application Example 1, wherein the first determination parameter is a relative lateral direction distance between the target vehicle and a host vehicle.

Application Example 3: The device for setting a target vehicle according to Application Example 1 or 2, wherein the setting control unit also uses an additional parameter in addition to the first determination parameter to determine whether to set the forward object as the target vehicle if a combination history is associated with the forward object.

Application Example 4: The device for setting a target vehicle according to Application Example 3, wherein the additional parameter includes at least one of a vehicle width direction overlap amount between the forward object and the host vehicle, and a vehicle width direction clearance amount between the forward object and a road marking that defines a travel lane of the host vehicle.

Application Example 5: The device for setting target vehicle according to any one of Application Examples 1 to 4; wherein the setting control unit inhibits the setting of the forward object as the target vehicle if the driving assistance control is being executed with respect to the target vehicle.

Application Example 6: The device for setting a target vehicle according to Application Example 5, wherein the setting control unit does not inhibit the setting of the forward object as the target vehicle if a relative lateral direction distance between the target vehicle and the host vehicle is greater than or equal to a first reference value.

Application Example 7: The device for setting a target vehicle according to Application Example 5, wherein the setting control unit does not inhibit the setting of the forward object as the target vehicle if the target vehicle has performed a course change.

Application Example 8: The device for setting target vehicle according to any one of Application Examples 1 to 4; wherein the setting control unit inhibits the setting of the forward object as the target vehicle if a course change may be performed that results in the host vehicle separating from the forward object, or if a course change is being executed.

Application Example 9: The device for setting target vehicle according to any one of Application Examples 1 to 4; wherein the setting control unit does not inhibit the setting of the forward object as the target vehicle if a course change may be performed that results in the host vehicle approaching the forward object, or if a course change is being executed.

Application Example 10: A system for setting a target vehicle, including: a device for setting target vehicle according to any one of Application Examples 1 to 9; a first detection unit that outputs the first detection signal; and a second detection unit that outputs the second detection signal.

Application Example 11: The system for setting a target vehicle according to Application Example 10, wherein a constant travel speed/inter-vehicle distance control unit that executes constant travel speed/inter-vehicle distance control processing with respect to the target vehicle that has been set.

What is claimed is:

1. A driving support device that performs traveling to follow a preceding vehicle traveling in front of a host vehicle, the driving support device comprising:
 a first detection unit that detects an object in front of the host vehicle at a reflection point, a second detection unit that detects the object using an image, and a control unit that is communicably connected to the first detection unit and the second detection unit, and configured to:

determine whether the object is a moving object or a stationary object;

select a moving object threshold or a stationary object threshold as a selection threshold for determining whether to set the object as a target vehicle based on determing whether the object is a moving object or a stationary object;

determine whether a determination parameter of the object is less than the selection threshold; and in response to determining that the determination parameter of the object is less than the selection threshold, set the object as the target vehicle to follow, wherein the determination parameter of the object comprises a relative lateral distance between an outer extent of the object and an outer extent of the host vehicle, the stationary object threshold comprises a smaller value than the moving object threshold, in response to determining that the relative lateral distance being equal to or greater than the selection threshold, the control unit does not set the object as the target vehicle to follow, and in response to determining that the relative lateral distance is less than the selection threshold, the control unit sets the object as the target vehicle to follow.

2. The driving support device according to claim 1, wherein the control unit is configured to select the moving object as the target vehicle to follow regardless of whether the moving object is determined to be a vehicle.

3. The driving support device according to claim 1, wherein the control unit is configured to select the moving object as a target vehicle to follow with priority over the stationary object determined to be a vehicle.

4. The driving support device according to claim 1, wherein the control unit is configured to determine whether an amount of overlap between the object and the host vehicle in the lateral direction is less than a predetermined value, and not select the moving object as the target vehicle to follow when the amount of overlap between the object and the host vehicle in the lateral direction is less than the predetermined value.

5. A driving support method that performs traveling to follow a preceding vehicle traveling in front of a host vehicle, the driving support method comprising:

detecting an object in front of the host vehicle at a reflection point by a first detection unit, detecting the object using an image by a second detection unit, determining whether the object is a moving object or a stationary object;

selecting a moving object threshold or a stationary object threshold as a selection threshold for determining whether to set the object as a target vehilce based on determining whether the object is a moving object or a stationary object;

determining whether a determination parameter of the object is less than the selection threshold; and in response to determining that the determination parameter of the object is less than the selection threshold, setting the object as the target vehicle to follow, wherein the determination parameter of the object comprises a relative lateral distance between an outer extent of the object and an outer extent of the host vehicle, the stationary object threshold comprises a smaller value than the moving object threshold, in response to determining that the realtive lateral distance being equal to or greater than the selection threshold, the object is not set as the target vehicle to follow, and in response to determining that the realtive lateral distance is less than the selection threshold, the object is set as the target vehicle to follow.

6. A driving support program that performs traveling to follow a preceding vehicle traveling in front of a host vehicle, the driving support program stored in a nonvolatile, non-transitory computer readable medium which causes a computer to execute the processing of:

detecting an object in front of the host vehicle at a reflection point by a first detection unit;

detecting the object using an image by a second detection unit;

determining whether the object is a moving object or a stationary object;

selecting a moving object threshold or a stationary object threshold as a selection threshold for determining whether to set the object as a target vehicle based on determing whether the object is a moving object or a stationary object;

determining whether a determination parameter of the object is less than the selection threshold; and in response to determining that the determination parameter of the object is less than the selection threshold, setting the object as the target vehicle to follow, wherein the determination parameter of the object comprises a relative lateral distance between an outer extent of the object and an outer extent of the host vehicle, the stationary object threshold comprises a smaller value than the moving object threshold, in response to determining that the relative lateral distance being equal to or greater than the selection threshold, the object is not set as the target vehicle to follow, and in response to determining that the realtive lateral distance is less than the selection threshold, the object is set as the target vehicle to follow.

* * * * *